United States Patent
Bringewatt et al.

(10) Patent No.: US 11,377,781 B2
(45) Date of Patent: Jul. 5, 2022

(54) METHOD AND DEVICE FOR FEEDING LAUNDRY PIECES TO A LAUNDRY TREATMENT INSTALLATION

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 17/108,307

(22) Filed: Dec. 1, 2020

(65) Prior Publication Data
US 2021/0172112 A1 Jun. 10, 2021

(30) Foreign Application Priority Data
Dec. 4, 2019 (DE) .......................... 102019008417.9

(51) Int. Cl.
*D06F 67/04* (2006.01)
*D06F 69/02* (2006.01)
*B65G 47/64* (2006.01)

(52) U.S. Cl.
CPC .............. *D06F 67/04* (2013.01); *D06F 69/02* (2013.01); *B65G 47/64* (2013.01); *B65G 2201/0229* (2013.01)

(58) Field of Classification Search
CPC ................ B65G 47/64; B65G 2201/00; B65G 2201/02; B65G 2201/0229; D06F 67/00–10; D06F 69/02; D06F 69/00
See application file for complete search history.

(56) References Cited

U.S. PATENT DOCUMENTS

| 4,106,227 A | * | 8/1978 | Allen | ...................... D06F 67/04 38/143 |
| 4,378,645 A | * | 4/1983 | Allen | ...................... D06F 67/04 38/8 |

(Continued)

FOREIGN PATENT DOCUMENTS

| DE | 7739858 U1 | 7/1980 |
| DE | 3602892 A1 | 8/1987 |

(Continued)

OTHER PUBLICATIONS

European Patent Office, Europaischer Recherchenbericcht (search in a related application), dated Mar. 18, 2021.

(Continued)

*Primary Examiner* — Ismael Izaguirre
(74) *Attorney, Agent, or Firm* — Laurence P. Colton; Smith Tempel Blaha LLC

(57) ABSTRACT

A method and device for feeding laundry pieces to a laundry treatment installation. Laundry pieces are fed to ironers by infeed machines. In practice, a front transverse periphery of a laundry piece is folded back on itself. In order to prevent this, infeed machines have stretching installations that have belt conveyors that lie on top of one another, one of which is briefly decelerated so as to unravel a front transverse periphery of the laundry piece that is folded back on itself. This deceleration decreases the infeed performance. One belt conveyor of the present stretching installation is at least temporarily driven at a faster speed to unravel a transverse periphery of the laundry piece that has potentially folded back on itself before the laundry piece runs into the ironer, increasing the infeed performance as it is no longer necessary for either of the belt conveyors to be decelerated.

17 Claims, 1 Drawing Sheet

(56) References Cited

U.S. PATENT DOCUMENTS

| | | | | | |
|---|---|---|---|---|---|
| 5,515,627 | A | * | 5/1996 | McCabe | D06F 67/04 38/143 |
| 5,595,467 | A | * | 1/1997 | Jensen | D06F 67/04 271/175 |
| 5,815,963 | A | * | 10/1998 | Rauch | D06F 67/04 38/143 |

FOREIGN PATENT DOCUMENTS

| | | |
|---|---|---|
| DE | 8813291 U1 | 1/1989 |
| DE | 3825646 A1 | 2/1990 |
| DE | 4405458 A1 | 7/1995 |
| DE | 20009588 U1 | 9/2000 |
| DE | 102014014510 A1 | 4/2015 |
| EP | 0161716 A1 | 11/1985 |
| GB | 353772 A | 7/1931 |
| WO | 2006125656 A1 | 11/2006 |

OTHER PUBLICATIONS

Deutsches Patent—und Markenamt (German Patent and Trademark Office), Recherchebericht (search in a related application), dated Mar. 9, 2020.

\* cited by examiner

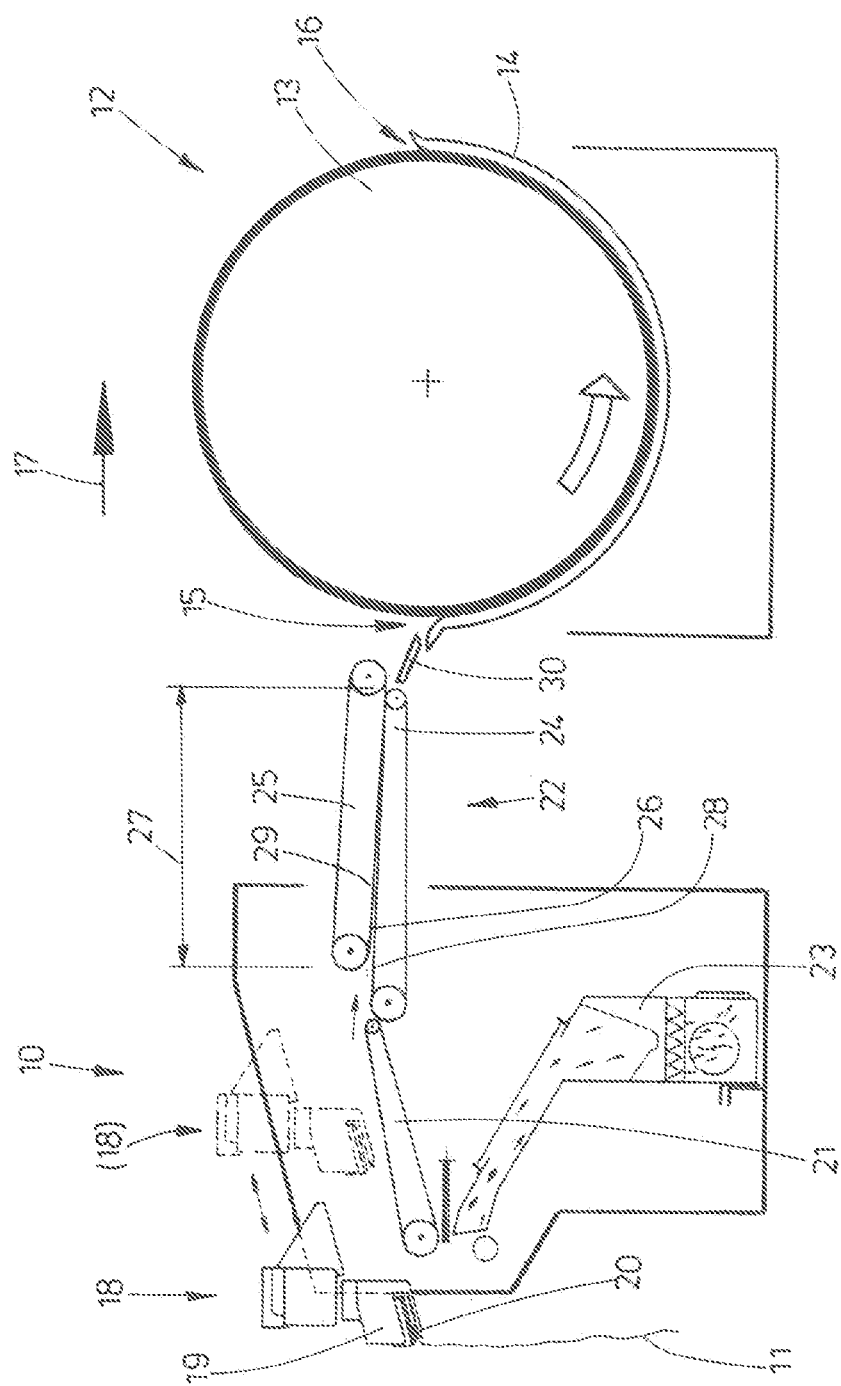

METHOD AND DEVICE FOR FEEDING LAUNDRY PIECES TO A LAUNDRY TREATMENT INSTALLATION

CROSS REFERENCE TO RELATED APPLICATIONS

This patent application claims the benefit of and priority on German Patent Application No. 10 2019 008 417.9 having a filing date of 4 Dec. 2019.

BACKGROUND OF THE INVENTION

Technical Field

The invention relates to a method for feeding laundry pieces to a laundry treatment installation, preferably an ironer, in that a respective laundry piece is placed so as to be spread out onto a infeed conveyor, the laundry piece by the infeed conveyor is transported in the feeding direction to a stretching installation having belt conveyors that are disposed on top of one another and stretch the laundry piece in the feeding direction. The invention furthermore relates to a device for feeding laundry pieces to a laundry treatment installation, having an infeed conveyor for transporting a laundry piece in the feeding direction, and having a stretching installation which is disposed downstream of the infeed conveyor and has at least one pair of belt conveyors that are disposed on top of one another.

Prior Art

The devices discussed here, which in the industry jargon are also referred to as "infeed machines", serve for feeding spread-out laundry pieces to a laundry treatment installation. The laundry treatment installation is preferably an ironer, specifically an ironer of any type such as, for example a trough ironer and belt ironer. Unless comparatively small laundry pieces, for example napkins, are manually spread out, infeed machines also serve for spreading out the laundry pieces, in particular comparatively large laundry pieces, and to place the latter so as to spread out onto an infeed conveyor of the infeed machine. The laundry pieces are then either manually inserted into the spreading clamps of the spreading installation or automatically introduced into the spreading clamps.

It is important in particular in the case of ironers that the laundry pieces are spread out or stretched out on the infeed conveyors such that the periphery of said laundry pieces that runs transversely to the feeding direction and leads in the feeding direction runs in an ideally rectilinear manner, and the periphery, in particular in the case of seamed laundry pieces, is not folded back or folded back on itself. The laundry pieces moreover have to lie so as to be spread out in an almost crease-free manner on the infeed conveyor. Otherwise, the laundry pieces cannot be ironed with the required quality.

Devices for feeding laundry pieces to the laundry treatment installation are already known, said devices in particular connected to the infeed conveyor having a stretching installation of at least one pair of belt conveyors that are disposed on top of one another. The stretching installation serves for front peripheries of the laundry pieces that run transversely to the feeding direction and are potentially folded back to be unraveled and for any potential creases in spread out laundry pieces to be eliminated. In the case of known devices, this takes place by briefly decelerating the lower belt conveyor of the stretching installation. The upper belt conveyor, which continues to run as the lower belt conveyor is being decelerated, then eliminates creases and unravels any front transverse edge of the laundry piece that is potentially folded back on itself. It is disadvantageous herein that the onward transportation of the laundry pieces through the stretching installation is interrupted while the lower belt conveyor is being briefly decelerated. This reduces the productivity of the known device.

BRIEF SUMMARY OF THE INVENTION

Proceeding from the above, the invention is based on the object of achieving a method and a device for feeding laundry pieces to a laundry treatment installation, said method and device enabling an improved infeed performance without any compromises in terms of quality, in the downstream treatment, in particular when ironing, the laundry pieces.

A method for achieving this object is a method for feeding laundry pieces to a laundry treatment installation such as an ironer, in that a respective laundry piece is placed so as to be spread out onto a infeed conveyor, the laundry piece by the infeed conveyor is transported in the feeding direction to a stretching installation having belt conveyors that are disposed on top of one another and stretch the laundry piece in the feeding direction, and the laundry piece after having passed through the stretching installation is fed to the laundry treatment installation, and wherein the belt conveyors of the stretching installation that are disposed on top of one another are at least temporarily driven at mutually deviating speeds. Accordingly, it is provided that one belt conveyor of the respective pair of belt conveyors of the stretching installation that lie on top of one another to be at least temporarily driven at a higher speed. By virtue of one belt conveyor of the pair of belt conveyors that lie on top of one another being rapidly driven, slippage is exerted on the laundry piece, said slippage stretching the laundry piece situated in the region of the stretching conveyor in the feeding direction of the laundry piece toward the downstream laundry treatment installation, and/or unravelling any potentially folded-back front transverse edge of the laundry piece, in particular folding said front transverse edge in the feeding direction toward the front.

It is preferably provided that the belts of the respective pair of belt conveyors that lie on top of one another are to be configured such that the slippage is established between the belt conveyor that is at least temporarily or momentarily driven somewhat faster and the laundry piece. It is ensured on account thereof that the respective laundry piece is stretched in a targeted manner in the feeding direction, and any potentially folded-back front transverse periphery of the laundry piece is also reversed in the feeding direction.

It is furthermore preferably provided that one belt conveyor of the at least one pair of belt conveyors of the stretching installation that lie on top of one another, in particular a lower belt conveyor, is to be driven at a constant speed. The speed of this belt conveyor also does not vary when the belt conveyor assigned thereto is driven at a faster speed, or at least momentarily driven at a faster speed. On account thereof, the basic speed of the laundry piece is maintained so as to be permanently non-variable when said laundry piece is being unraveled and/or stretched.

The second belt conveyor of the respective pair of belt conveyors of the stretching installation that lie on top of one another, said second belt conveyor preferably being an upper belt conveyor of the stretching installation, in one preferred potential design embodiment of the method is continuously or only temporarily driven at a higher speed. This preferably takes place while at least a front portion of the respective laundry piece is situated between the pair of belt conveyors that lie on top of one another. This part of the laundry piece that is situated between the pair of belt conveyors that lie on top of one another is then stretched in the feeding direction by the one belt conveyor of the pair of belt conveyors disposed on top of one another that is driven at a faster speed. It can be sufficient for the temporarily faster driving action of the one belt conveyor of the respective pair of belt conveyors that lie on top of one another to take place only briefly and for the part of the laundry piece that lies between the belt conveyors in this instance to be stretched in an abrupt manner. This is sufficient in particular for reversing or stretching in the feeding direction any potential folded-back front transverse edge of the laundry piece.

However, it would also be conceivable that a belt conveyor, in particular an upper belt conveyor, of the respective pair of belt conveyors of the stretching installation that lie on top of one another is permanently driven at a speed that is higher than that of the neighboring belt conveyor. It can be sufficient in this instance that the speed differential between the neighboring belt conveyors that lie on top of one another is comparatively minor because permanent stretching of the laundry piece in the feeding direction takes place during the entire passage of the respective laundry piece through the stretching installation.

In the case of all potential design embodiments of the method described above, the infeed performance of laundry pieces to the laundry treatment installation is not compromised by stretching the respective laundry piece because the infeed speed is not reduced in order for the laundry piece to be stretched in that one belt conveyor of the pair of belt conveyors that lie on top of one another is briefly decelerated, but according to the invention both belt conveyors are driven in an uninterrupted manner, specifically one belt conveyor is driven at a constant speed and the other belt conveyor of the pair of belt conveyors that lie on top of one another is at least temporarily driven at a higher speed.

The speed of the at least one other belt conveyor of the respective pair of belt conveyors lying on top of one another that is at least temporarily driven at a higher speed can be 1% to 30%, preferably 1% to 20%, above the speed, in particular the infeed speed, of the belt conveyor that is driven at a constant speed. The speed differential in the case of other belt conveyors that are permanently driven at a higher speed is smaller than in the case of other belt conveyors that are only briefly driven at a high speed. The shorter the temporal period of the faster driving of the other belt conveyor, the higher the speed differential between the at least one pair of belt conveyors of the stretching installation that lie on top of one another.

A device for achieving the object mentioned at the outset is a device for feeding laundry pieces to a laundry treatment installation such as an ironer, having an infeed conveyor for transporting a laundry piece in the feeding direction, and having a stretching installation which is disposed downstream of the infeed conveyor and has at least one pair of belt conveyors that are disposed on top of one another, wherein the belt conveyors that are disposed on top of one another are assigned at least one drive by way of which one belt conveyor is able to be at least temporarily driven at a higher speed than that of the other belt conveyor. Accordingly, each of the belt conveyors that are disposed on top of one another, in particular each belt conveyor of a respective pair of belt conveyors that are disposed on top of one another, possesses a dedicated drive, or the respective pair of belt conveyors that lie on top of one another is assigned a common drive which is coupled, in particular way of a transmission, to the different belt conveyors that lie on top of one another such that one of the belt conveyors of the respective pair of belt conveyors that are disposed so as to lie on top of one another is able to be at least temporarily driven at a higher speed. The first-mentioned alternative is particularly suitable in the case of a (first) belt conveyor being only temporarily driven at a higher speed than that of the (other) belt conveyor assigned thereto. The second alternative is then preferable when both belt conveyors that lie on top of one another are permanently driven at constant but dissimilar speeds.

In the case of each pair of belt conveyors that lie on top of one another being in each case provided with dedicated drives, at least that belt conveyor that is at least temporarily driven at a higher speed than that of the other belt conveyor is assigned a drive with variable speed. This belt conveyor can then be temporarily driven at a higher speed, while said belt conveyor in the remaining time is driven at the same speed as that of the belt conveyor of the respective pair of belt conveyors lying on top of one another that is assigned thereto.

However, in the case of belt conveyors that lie on top of one another being permanently driven at dissimilar speeds, it is also conceivable for one belt conveyor by a variable-speed drive to be driven at temporarily or periodically varying speeds which are always somewhat higher than the speed of the other belt conveyor of the respective pair of belt conveyors that lie on top of one another. This enables a respective laundry piece to be individually stretched in the region of the stretching installation.

In the case of a common drive of the belt conveyors of the respective belt conveyor pair that are disposed on top of one another it is advantageously provided that a transmission or another transmission-type coupling with a corresponding transmission ratio is provided between the common drive and the belt conveyor that is at least temporarily to be driven at a faster speed. This coupling can optionally be configured such that the transmission ratio thereof is variable from driving both belt conveyors that are disposed on top of one another at identical speeds to at least temporarily driving one belt conveyor of the respective or only belt conveyor pair that are disposed on top of one another at a higher speed.

It is conceivable for the variation of the speed of the respective belt conveyor to be performed in a stepless and/or stepped manner so as to implement the desired speed profile. A variation of the speed in a stepped manner can in particular lead to an impulse which more effectively stretches the laundry piece in the stretching installation.

According to one advantageous refinement of the device it is provided that a stretching gap is provided between the belt conveyors of the stretching installation that are disposed on top of one another. In the case of stretching installations having a plurality of successive pairs of belt conveyors that lie on top of one another, such a stretching gap is preferably provided between each pair of belt conveyors that lie on top of one another. The laundry piece is able to be transported through the respective stretching gap.

It is preferably provided that the stretching gap diminishes in particular in a continuous manner. A wedge-type stretching gap which preferably continuously diminishes in the feeding direction is created here between the respective pair of belt conveyors that lie on top of one another. On account of such a stretching gap, the belt conveyors that are disposed on top of one another in pairs, when viewed in the feeding direction, exert an increasing pressure on both sides of the laundry piece running through the stretching gap. On account thereof, the friction lock between the belt conveyors and the laundry piece preferably continuously increases in the feeding direction. In phases in which one belt conveyor is driven at a higher speed, this in the feeding direction leads to an increasing slippage between at least one belt conveyor and the laundry piece that is being conveyed through the stretching gap.

Another advantageous potential refinement of the device provides that belts of the belt conveyors of the respective belt conveyor pair that lie on top of one another in pairs have surfaces which come into contact with the respective laundry piece and are dissimilar in such a manner that said surfaces exert dissimilar friction forces and/or entrainment forces on opposite sides of the laundry piece between the belt conveyors lying on top of one another. It is guaranteed on account thereof that the respective laundry piece can be entrained in a friction-locking manner and without any significant slippage or only a minor slippage by the belt conveyor that is driven at a constant basic speed and infeed speed, while a slippage, in particular a higher degree of slippage, can arise between the at least opposite belt conveyor that is at least temporarily driven at a higher speed and the laundry piece as long as this belt conveyor is driven at a higher speed than that of the opposite belt conveyor assigned thereto. On account thereof, the laundry piece by said belt conveyor is transported through the stretching gap of the stretching installation at a constant speed, specifically the infeed speed.

BRIEF DESCRIPTION OF THE DRAWING

A preferred exemplary embodiment of the invention will be explained in more detail hereunder by means of the single FIGURE of the drawing.

FIG. 1 schematically shows the device configured according to the invention and in an exemplary manner highlights the method according to the invention that can be carried out by said device.

DETAILED DESCRIPTION OF PREFERRED EMBODIMENTS

The device shown in here is configured as an infeed machine 10, as shown in FIG. 1. The infeed machine 10 serves for feeding laundry pieces 11 individually and successively to a laundry treatment installation. An ironer 12 is illustrated as the laundry treatment installation in the FIGURE. This herein is a trough ironer having a heated ironer roller 13 which can be driven in a rotating manner, and a stationary ironer trough 14 that is assigned to the lower half of the ironer roller 13. The ironer trough 14 can be heated and be configured in a flexible manner. The ironer 12 possesses an entry region 15 which is directed toward the infeed machine 10, and an exit region 16 which is opposite the entry region 15.

A respective laundry piece 11 by the infeed machine 10 is fed in the feeding direction 17 to the entry region 15 of the ironer 12, transported through the ironer 12 by the rotatingly driven ironer roller between the latter and the ironer trough 14 and herein ironed, specifically completely dried and ironed. The laundry piece 11 that has in each case been ironed exits the ironer 12 at the exit region 16.

The invention is not limited to the ironer 12 shown here. For example, the trough ironer can have a plurality of successive ironer rollers 13 having in each case one ironer trough 14 assigned thereto. It is also conceivable for ironers 12 of another type, for example belt ironers, to be disposed behind the infeed machine 10.

The infeed machine 10 shown here on the front side thereof possesses a spreading installation 18 having at least one pair of preferably identical spreading clamps 19. Only one spreading clamp 19 is shown in the FIGURE, specifically in the initial position of said spreading clamp 19 and (in dashed lines) in a transfer position which in the feeding direction 17 is offset from the initial position.

In the case of the spreading installation 18 shown, neighboring corners of a front transverse periphery 20 of the laundry piece 10 that runs transversely to the feeding direction 17 are manually inserted into the single or respective pair of spreading clamps 19. The spreading clamps 19 thereafter are diverged transversely to the feeding direction 17 so as to spread out the laundry piece 11 and to stretch the front transverse periphery 20 of the latter such that said transverse periphery 20 is stretched in an almost rectilinear manner with ideally little residual slack. After the spreading clamps 19 have been diverged, the laundry piece 10 which is held so as to be spread out by the spreading clamps 19, by advancing the spreading installation 18 in the feeding direction 17 (here to the position shown in dashed lines), by way of the stretched out front transverse periphery 20 and a region of the laundry piece 11 that adjoins said transverse periphery 20, is deposited on an infeed conveyor 21. A rear portion of the laundry piece 11 ahead of the infeed conveyor 11 herein is suctioned by a vacuum into a suction duct 23, on account of which this part of the laundry piece 11 is also stretched out and thus hangs in a substantially crease-free manner from the infeed conveyor 21. The laundry piece 11 is then transported by the infeed conveyor 21 in the feeding direction 17 to a downstream stretching installation 22.

The invention is also suitable for other types of infeed machines, for example such in which the corners of the front transverse periphery 20 of the respective laundry piece 11 are automatically transferred to the spreading clamps 19 of the spreading installation 18 and are hooked into said spreading clamps 19. However, the invention is also suitable for infeed machines which do not possess any spreading installation 18. In the case of such infeed machines, in particular for comparatively small laundry pieces, for example napkins, pillow cases, hand towels or the like, the small laundry pieces are manually spread out and/or stretched out and at least by way of a front transverse peripheral region are also manually placed onto the start of the infeed conveyor 21.

The stretching installation 22 shown here possesses a pair of belt conveyors that lie on top of one another and are preferably of a fundamentally identical configuration, specifically a lowered belt conveyor 24 and an upper belt conveyor 25. The stretching installation 22 can however also be formed by a plurality of successive pairs of in each case two belt conveyors 24 and 25 that are disposed on top of one another.

The belt conveyors 24 and 25 are disposed on top of one another such that a stretching gap 26 is situated between both said belt conveyors 24 and 25. The stretching gap 26 can be of identical width across the entire overlapping length 27 of the two belt conveyors 24 and 25, in that mutually facing leaders 28, 29 of the belt conveyors 24, 25 lying on top of one another run so as to be mutually parallel at a minor spacing, or bear on one another when no laundry piece 11 is situated between the belt conveyors 24, 25. However, in the exemplary embodiment shown it is provided that the stretching gap 26 is configured so as to be slightly wedge-shaped in that said stretching gap 26 continuously diminishes, specifically becomes narrower, in the feeding direction 17.

In the case of the device illustrated in the FIGURE, the upper belt conveyor 25 is configured so as to be somewhat shorter than the lower belt conveyor 24 and so as to be offset in the feeding direction 17 in relation to the lower belt conveyor 24. On account thereof, a start of the lower belt conveyor 24 is exposed by the upper belt conveyor 25, and one end of the upper belt conveyor 25 extends beyond the end of the lower belt conveyor 24. The invention is however not limited thereto. The belt conveyors 24 and 25 can be configured in a manner that deviates from the illustration in the FIGURE and be disposed on top of one another in particular without being mutually offset and/or have identical lengths.

Each of the belt conveyors 24 and 25 of fundamentally identical configuration possesses a conveyor belt that can be driven in the revolving manner between two opposite deflection rollers. Mutually facing leaders 28 and 29 of the conveyor belts of the belt conveyors 24 and 25 that are disposed on top of one another the limit the stretching gap 26 on both sides.

One deflection roller of each belt conveyor 24 and 25 of the stretching installation 22 can be driven. To this end, each driven deflection roller of the lower belt conveyor 24 as well is of the upper belt conveyor 25 can be assigned a dedicated drive which is not shown in the FIGURE. It is assumed hereunder that the belt conveyor 25 is permanently or at least temporarily able to be driven at a faster speed than that of the lower belt conveyor 24. The drive of the upper belt conveyor 25 in this instance is configured either such that said drive drives the belt of said upper belt conveyor 25 at a faster speed than the drive of the lower belt conveyor 24. In the case of an upper belt conveyor 25 that is permanently driven at a constantly higher speed, the drive of the upper belt conveyor 25 does not have to be adjustable. The drive of the belt of the lower belt conveyor 24 is likewise preferably not adjustable when the lower belt conveyor 24 is permanently driven at the same speed.

When the upper belt conveyor 25 is to be able to be only temporarily driven at a higher speed in relation to the lower belt conveyor 24, the drive of the belt of the upper belt conveyor 25 is expediently configured as an adjustable drive which permits the speed for driving the belt of the upper belt conveyor 25 to be varied in a stepless or optionally also a stepped manner.

In particular when the upper belt conveyor 25 is permanently driven at a slightly higher speed than the lower belt conveyor 24 which is likewise being driven at a constant but lower speed, it is also conceivable that the respective driven deflection rollers of the lower belt conveyor 24 as well as of the upper belt conveyor 25 to be driven by a common drive. This common drive, in particular motor, in this instance has a drive connection, preferably by way of a transmission, to the driven deflection roller of the lower belt conveyor 24 as well as of the upper belt conveyor 25. However, the drive connection to at least one of the belt conveyors 24, 25 possesses a positive or negative transmission ratio which leads to the belt of the upper belt conveyor 25 revolving at a higher speed than the belt of the lower belt conveyor 24.

The belts of both belt conveyors 24 and 25, in particular the surfaces thereof that come into contact with the respective side of the laundry piece 10, are configured such that the respective laundry piece 11 is reliably entrained by the leader 28 of the lower belt conveyor 24 that comes into contact with said laundry piece 11, but that a slippage between at least the leader 29 of the upper belt conveyor 25 that contacts the laundry piece 11 and the laundry piece 11 is possible at least during the phase in which the upper belt conveyor 25 is driven at a higher speed.

A transfer means 30 is indicated in the FIGURE in the transition region from the end of the stretching installation 22, in particular of the lower belt conveyor 25 of the latter, that points toward the ironer 12 and the entry region 15 of the ironer 12. In the simplest case, this herein can be a guide which adjoins the stretching gap 26 and extends up to the start of the entry region 15, said guide being configured as a smooth sheet-metal plate, for example, or else being a belt conveyor.

The length of the stretching installation 22, in particular the overlapping length 27 of the belt conveyors 24 and 25 that are disposed on top of one another, in the device shown here is chosen such that at least comparatively large laundry pieces 11 do not completely fit into the stretching installation 22 such that, when viewed in the feeding direction 17, only part of the affected (large) laundry piece 11 is at all-time situated between the belt conveyors 24, 25. This serves for reducing the installation length of the infeed machine 11. If required, the stretching installation 22 can be configured so long that even larger laundry pieces can be completely accommodated in said stretching installation 22. In this instance, it may also be expedient for the stretching installation 22 to be formed from a plurality of successive pairs of belt conveyors 24, 25 that lie on top of one another. In this case, when viewed in the feeding direction 17, it is conceivable to permit at least one belt conveyor 24, 25 of the last pair of belt conveyors 24, 25 that are disposed on top of one another to at least temporarily run at a higher speed than that of the upstream belt conveyors 24, 25.

The method according to the invention will be explained hereunder with reference to the device described above.

A respective laundry piece 11 which has been spread out, preferably stretched, by the spreading installation 18 is deposited onto the start of the infeed conveyor 21 by the spreading installation 18 and is transported by said infeed conveyor 21 to the stretching installation 22. The spreading installation 18 spreads or stretches the front transverse periphery 20 of the laundry piece 11 that leads in the feeding direction 17 and runs transversely to the feeding direction to the extent that said front transverse periphery 20 runs so as to be approximately rectilinear and transverse to the feeding direction 17.

From the infeed conveyor 21 the laundry piece 11 by way of the spread out and/or stretched front transverse periphery 20 makes its way into the stretching installation 22, specifically into the start of the stretching gap 26 between the belt conveyors 24 and 25 of the stretching installation 22 that are disposed on top of one another.

In the description hereunder of the method it is assumed that the upper belt conveyor 25 is at least temporarily and/or periodically driven at a faster speed than that of the lower belt conveyor 24. The lower belt conveyor 24 of the stretching installation 22 is driven at a constant speed which preferably corresponds to the infeed speed. This speed may correspond to that of the infeed conveyor 21 which is also permanently driven at the same speed. Conversely however, it would also be possible for the lower belt conveyor 24 to be at least temporarily driven at a faster speed than that of the upper belt conveyor 25.

It is preferably provided that the lower belt conveyor 24 is driven at such a constant speed which is somewhat higher than the speed at which the infeed conveyor 21 transports the respective laundry piece 11 in the feeding direction 17 to the stretching installation 22.

A plurality of alternatives are conceivable in terms of the drive of the upper belt conveyor 25 in order for the latter to at least temporarily run faster than the lower belt conveyor 24.

In one case, the upper belt conveyor 25 is permanently driven at a constant speed which however is higher than the likewise constant speed of the lower belt conveyor 24. In this instance, the speed differential between the lower belt conveyor 24 and the permanently faster driven upper belt conveyor 25 has to be only comparatively minor. It suffices in this instance for the upper belt conveyor 25 to be driven at a speed that is 0.5% to 10%, in particular 1% to 5%, higher than the speed of the lower belt conveyor 24.

In another case, the upper belt conveyor 25 is only temporarily and/or periodically driven at a faster speed than that of the lower belt conveyor 24. Unless driving of the upper belt conveyor 24 takes place at a faster speed, the two belt conveyors 24 and 25 of the stretching installation 22 that lie on top of one another are driven at the same speed.

It is also conceivable that the upper belt conveyor 25 is permanently driven at a higher speed than the lower belt conveyor 24 but the speed differential between the belt conveyors 24 and 25 is variable in that the upper belt conveyor 25 is periodically and/or alternatingly driven at an only slightly higher or significantly higher speed. For example, the significantly higher driving speed of the upper belt conveyor 25 can be 1.2 to 3 times of the only slightly higher speed of the upper belt conveyor 25.

The at least temporarily higher speeds of the upper belt conveyor 25 in relation to the lower belt conveyor 24 that are implemented as described above, in the region of the overlapping length 27 of the belt conveyors 24 and 25 of the stretching installation 22 that lie on top of one another lead to the entire laundry piece 11, or only that part of the laundry piece 11 that is situated between the belt conveyors 24 and 25, to be stretched. This stretching takes place in the feeding direction 17. A speed differential between the belt conveyors 24, 25 arises at least in phases in which the upper belt conveyor 25 is driven at a higher speed than that of the lower belt conveyor 24. On account thereof, a force generated on account of the friction lock between the laundry piece 11 and at least one of the leaders 28, 29 of the belt conveyors 24, 25 is exerted on the laundry piece 11 by the respective leader 28, 29. On account thereof, the laundry piece 11 is pulled and/or stretched in the feeding direction 17. A front transverse periphery 20 which is potentially folded back on itself counter to the feeding direction 17 herein is in particular reversed, specifically unraveled in the feeding direction 17. Moreover, any potential unevenesses, creases or kinks which the laundry piece 11 still has between the belt conveyors 24 and 25 can be eliminated by the stretching installation 22 on account of the upper belt conveyor 25 which is periodically driven at a higher speed, in particular by a slippage that is caused on account thereof between the leader 29 of said upper belt conveyor 25 and that side of the laundry piece 11 that bears on said leader 29.

Once the laundry piece 11 has been stretched so far apart by the stretching installation 22 that a front transverse periphery 20 that has been potentially folded back on itself has been unraveled conjointly with a narrow region adjoining said transverse periphery 20, and the laundry piece 11 in the stretching installation 22 has otherwise also been stretched in such a manner that any potential creases or kinks in the feeding direction 17 have at least been largely eliminated, the laundry piece 11 is pushed by the stretching installation 22 onto and over the transfer means 30 such that the laundry piece 11 by way of the leading unraveled front transverse periphery 20 thereof can run into the entry region 15 of the ironer 12.

LIST OF REFERENCE SIGNS

10 Infeed machine
11 Laundry piece
12 Ironer
13 Ironer roller
14 Ironer trough
15 Entry region
16 Exit region
17 Feeding direction
18 Spreading installation
19 Spreading clamp
20 Front transverse periphery
21 Infeed conveyor
22 Stretching installation
23 Suction duct
24 Lower belt conveyor
25 Upper belt conveyor
26 Stretching gap
27 Overlapping length
28 Lead
29 Lead
30 Transfer means

What is claimed is:

1. A method for feeding laundry pieces (11) to a laundry treatment installation, comprising:
   placing a respective laundry piece (12) so as to be spread out onto a infeed conveyor (21);
   transporting the laundry piece (11) by the infeed conveyor (21) in a feeding direction (17) to a stretching installation (22) having a lower belt conveyor (24) and an upper belt conveyor (25) that are disposed on top of one another and stretch the laundry piece (11) in the feeding direction (17); and
   feeding the laundry piece (11) after having passed through the stretching installation (22) to the laundry treatment installation,
   wherein the belt conveyors (24, 25) of the stretching installation (22) that are disposed on top of one another are at least temporarily driven at mutually deviating speeds.

2. The method as claimed in claim 1, wherein the lower belt conveyor (24) of the stretching installation (22) is driven at a constant speed.

3. The method as claimed in claim 2, wherein the upper belt conveyor (25) of the stretching installation (22) is at least temporarily driven at a speed that is higher than that of the lower belt conveyor (24) assigned to the upper belt conveyor (25).

4. The method as claimed in claim 3, wherein the at least temporarily higher speed of the upper belt conveyor (25) is 1% to 10% higher than that of the lower belt conveyor (24) driven at a constant speed.

5. The method as claimed in claim 2, wherein the upper belt conveyor (25) of the stretching installation (22) at least temporarily, while at least a front portion of the laundry piece (11) is situated in the stretching installation (22), is driven at a speed that is higher than that of the lower belt conveyor (24) assigned to the upper belt conveyor (25).

6. The method as claimed in claim 1, wherein the lower belt conveyor (24) of the stretching installation (22) is driven at a constant speed which corresponds to the feeding speed of the laundry piece (11) to the laundry treatment installation.

7. The method as claimed in claim 1, wherein the belt conveyors (24, 25) of the stretching installation (22) that are disposed on top of one another are permanently driven at dissimilar speeds.

8. The method as claimed in claim 7, wherein the belt conveyors (24, 25) of the stretching installation (22) that are disposed on top of one another are permanently driven at dissimilar speeds, wherein the upper belt conveyor (25) is permanently driven at a speed that is higher than that of the lower belt conveyor (24).

9. A device for feeding laundry pieces (11) to a laundry treatment installation, the device having an infeed conveyor (21) for transporting a laundry piece (12) in a feeding direction (17), and having a stretching installation (22) which is disposed downstream of the infeed conveyor (21) and has at least a lower belt conveyor (240 and an upper belt conveyor (25) that are disposed on top of one another, wherein the belt conveyors (24, 25) that are disposed on top of one another are assigned at least one drive by way of which the upper belt conveyor (25) is able to be at least temporarily driven at a higher speed than that of the lower belt conveyor (24),
- wherein each of the belt conveyors (24, 25) that are disposed on top of one another has a dedicated drive which is configured in such a manner that the upper belt conveyor (25) is at least temporarily able to be driven faster than the lower belt conveyor (24), and
- wherein, in the case of the belt conveyors (24, 25) that are disposed on top of one another and have in each case a dedicated drive, the drive is variable in terms of speed in order to at least temporarily drive the upper belt conveyor (25) assigned to said dedicated drive.

10. The device as claimed in claim 9, wherein a stretching gap (26) through which the respective laundry piece (11) is able to be transported is provided between the belt conveyors (24, 25) of the stretching installation (22) that are disposed on top of one another.

11. The device as claimed in claim 10, wherein the stretching gap (26) in the feeding direction (17) continuously diminishes in such a manner that the belt conveyors (24, 25) that are disposed on top of one another in pairs exert an increasing pressure on both sides of the laundry piece (11) in the feeding direction (17).

12. A device for feeding laundry pieces (11) to a laundry treatment installation, the device having an infeed conveyor (21) for transporting a laundry piece (12) in a feeding direction (17), and having a stretching installation (22) which is disposed downstream of the infeed conveyor (21) and has at least a lower belt conveyor (24) and an upper belt conveyor (25) that are disposed on top of one another, wherein the belt conveyors (24, 25) that are disposed on top of one another are assigned at least one drive by way of which the upper belt conveyor (25) is able to be at least temporarily driven at a higher speed than that of the lower belt conveyor (24),
- wherein a common drive which is coupled to the belt conveyors (24, 25) with dissimilar transmission ratios in such a manner that the upper belt conveyor (25) is at least temporarily able to be driven so as to be faster than the lower belt conveyor (24) is assigned to the belt conveyors (24, 25) that are disposed on top of one another, and
- wherein in the case of the common drive of the belt conveyors (24, 25) that are disposed on top of one another a transmission-type coupling with a corresponding transmission ratio is disposed between the drive and one of the belt conveyors (24, 25).

13. The device as claimed in claim 12, wherein a stretching gap (26) through which the respective laundry piece (11) is able to be transported is provided between the belt conveyors (24, 25) of the stretching installation (22) that are disposed on top of one another.

14. The device as claimed in claim 13, wherein the stretching gap (26) in the feeding direction (17) continuously diminishes in such a manner that the belt conveyors (24, 25) that are disposed on top of one another in pairs exert an increasing pressure on both sides of the laundry piece (11) in the feeding direction (17).

15. A device for feeding laundry pieces (11) to a laundry treatment installation, the device having an infeed conveyor (21) for transporting a laundry piece (12) in a feeding direction (17), and having a stretching installation (22) which is disposed downstream of the infeed conveyor (21) and has at least a lower belt conveyor (24) and an upper belt conveyor (25) that are disposed on top of one another, wherein the belt conveyors (24, 25) that are disposed on top of one another are assigned at least one drive by way of which the upper belt conveyor (25) is able to be at least temporarily driven at a higher speed than that of the lower belt conveyor (24),
- wherein belts of the belt conveyors (24, 25) that lie on top of one another in pairs have surfaces which come into contact with the respective laundry piece (11) and are dissimilar in such a manner that said surfaces exert dissimilar friction forces on opposite sides of the respective laundry piece (11) situated in the stretching gap (26).

16. The device as claimed in claim 15, wherein a stretching gap (26) through which the respective laundry piece (11) is able to be transported is provided between the belt conveyors (24, 25) of the stretching installation (22) that are disposed on top of one another.

17. The device as claimed in claim 16, wherein the stretching gap (26) in the feeding direction (17) continuously diminishes in such a manner that the belt conveyors (24, 25) that are disposed on top of one another in pairs exert an increasing pressure on both sides of the laundry piece (11) in the feeding direction (17).

\* \* \* \* \*